(12) United States Patent
Hanan

(10) Patent No.: US 10,808,098 B2
(45) Date of Patent: *Oct. 20, 2020

(54) POLYETHYLENE TEREPHTHALATE-GRAPHENE NANOCOMPOSITES

(71) Applicant: THE BOARD OF REGENTS FOR OKLAHOMA STATE UNIVERSITY, Stillwater, OK (US)

(72) Inventor: Jay Clarke Hanan, Ontario, CA (US)

(73) Assignee: THE BOARD OF REGENTS FOR OKLAHOMA STATE UNIVERSITY, Stillwater, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,600

(22) Filed: Sep. 6, 2018

(65) Prior Publication Data

US 2019/0010304 A1    Jan. 10, 2019

Related U.S. Application Data

(63) Continuation of application No. 15/470,379, filed on Mar. 27, 2017, now Pat. No. 10,087,302, which is a continuation of application No. 14/115,580, filed on Nov. 4, 2013, now Pat. No. 9,636,855.

(51) Int. Cl.
| | |
|---|---|
| *C08K 3/04* | (2006.01) |
| *B82Y 30/00* | (2011.01) |
| *B29C 45/00* | (2006.01) |
| *C08J 3/22* | (2006.01) |
| *C01B 32/19* | (2017.01) |
| *C08K 9/08* | (2006.01) |
| *B29K 67/00* | (2006.01) |
| *B29K 507/04* | (2006.01) |

(52) U.S. Cl.
CPC .......... *C08K 3/042* (2017.05); *B29C 45/0001* (2013.01); *B29C 45/0013* (2013.01); *B82Y 30/00* (2013.01); *C01B 32/19* (2017.08); *C08J 3/22* (2013.01); *C08K 3/04* (2013.01); *B29K 2067/003* (2013.01); *B29K 2507/04* (2013.01); *C01B 2204/32* (2013.01); *C08J 2367/02* (2013.01); *C08K 9/08* (2013.01); *C08K 2201/003* (2013.01); *H05K 999/99* (2013.01); *Y10S 977/734* (2013.01); *Y10S 977/776* (2013.01)

(58) Field of Classification Search
CPC .... C08K 3/042; C08K 3/04; C08J 3/22; C08J 5/005; C01B 32/182; C01B 32/19; B29C 45/001; B29C 45/0013; B82Y 30/00; B29K 2067/003; B29K 2507/04

USPC .......................................................... 264/338
See application file for complete search history.

(56) References Cited

U.S. PATENT DOCUMENTS

| | | | | |
|---|---|---|---|---|
| 9,636,855 | B2 * | 5/2017 | Hanan | B29C 45/0001 |
| 9,957,360 | B2 * | 5/2018 | Hanan | C08J 3/22 |
| 10,087,302 | B2 * | 10/2018 | Hanan | B29C 45/0013 |
| 2007/0216067 | A1 | 9/2007 | Bahr et al. | |
| 2010/0204072 | A1 | 8/2010 | Kwon et al. | |
| 2011/0014492 | A1 * | 1/2011 | Joshi | C23C 18/1641 428/626 |
| 2013/0015409 | A1 | 1/2013 | Fugetsu | |
| 2014/0323002 | A1 | 10/2014 | Qin et al. | |

FOREIGN PATENT DOCUMENTS

| | | |
|---|---|---|
| JP | 2011016902 | 1/2011 |
| JP | 2011510906 A | 4/2011 |
| KR | 10-2011-012338 A | 11/2011 |
| WO | 2009134492 A2 | 11/2009 |
| WO | 2011008511 A1 | 1/2011 |
| WO | 2011028924 A2 | 3/2011 |

OTHER PUBLICATIONS

Feng, et al., "In Situ Synthesis of Poly(Ethylene Terephthalate)/Graphene Composites Using a Catalyst Support on Graphite Oxide", 2011, pp. 3931-3939, vol. 21, Publisher: Journal of Materials Chemistry, UK.

Meilu Li, et al, "Poly(Ethylene Terephthlate)/Exfoliated Graphite Nanocomposites With Improved Thermal Stability, Mechanical and Electrical Properties", 2011, pp. 560-566, Publisher: Composites: Part A 42, Published in: US.

Japanese Office Action dated Jan. 19, 2016, Yasuda, "Notification of Reasons for Rejection" (translated version) for Japanese Patent Application No. 2014-509453, entitled Polyethylene Terephalate-Graphene Nanocomposites, The Board of Regents for Oklahoma State University.

Hao-Bin Zhang et al., "Electrically Conductive Polyethylene Terephthalate/Graphene Nanocomposites Prepared by Melt Compounding", 2010, pp. 1191-1196, Publisher: Polymer 51, Published in: US.

The Board of Regents for Oklahoma State University, International Search Report and Written Opinion, PCT/US2012/036376, "Polyethylene Terephthalate-Graphene Nanocomposites", filed May 3, 2012.

* cited by examiner

*Primary Examiner* — Hannah J Pak

(74) *Attorney, Agent, or Firm* — Fellers, Snider, Blankenship, Bailey & Tippens, P.C.; Terry L. Watt

(57) ABSTRACT

A nanocomposite material comprises polyethylene terephthalate (PET) as a base polymer and a nanoparticle that increases the strength of the base polymer.

6 Claims, 4 Drawing Sheets

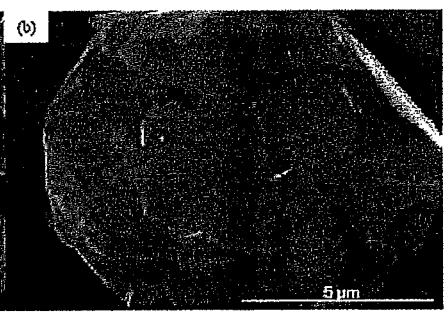
FIG. 1A    FIG. 1B
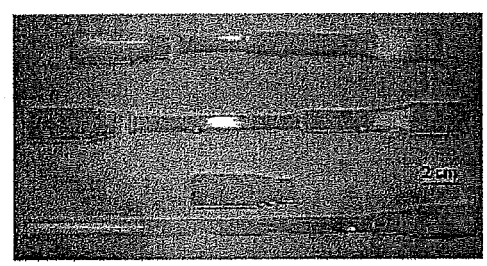
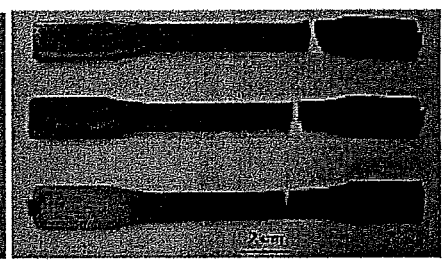
FIG. 2A    FIG. 2B

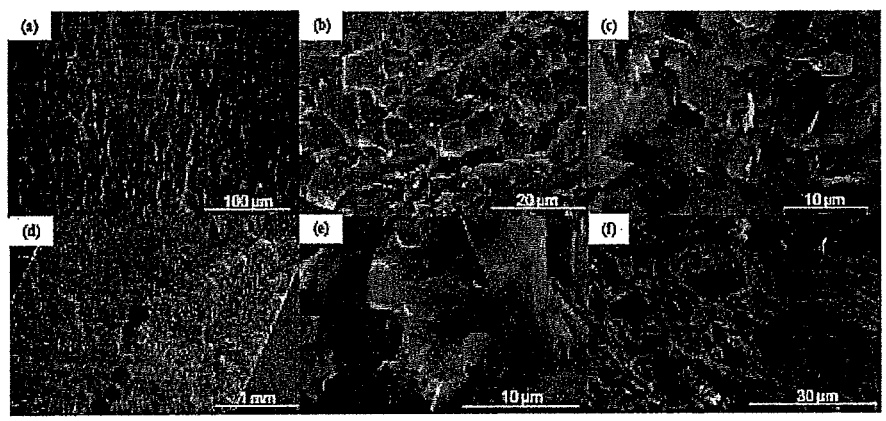
FIG. 3A  FIG. 3B  FIG. 3C
FIG. 3D  FIG. 3E  FIG. 3F
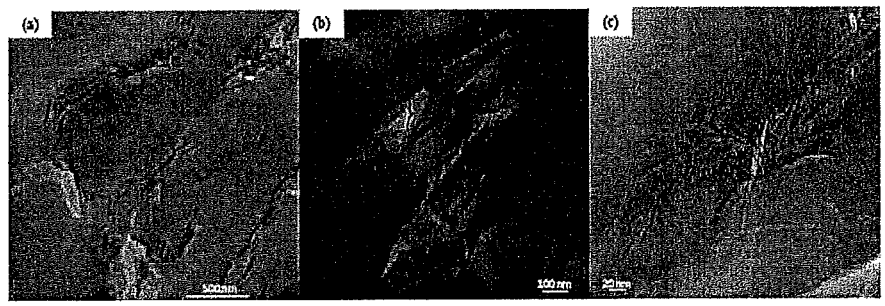
FIG. 4A  FIG. 4B  FIG. 4C ated May 2, 2017, which application is a continuation of U.S. Ser. No. 14/115,580, filed Nov. 4, 2013, now U.S. Pat. No. 9,636,855 B2, issued May 2, 2017, which application is a 371 entry in the U.S. from expired International Patent Application No. PCT/US2012/036376, filed May 3, 2012, which PCT application claims the benefit of U.S. Provisional Application No. 61/482,048 filed May 3, 2011, all herein incorporated by reference in their entirety for all purposes.

POLYETHYLENE TEREPHTHALATE-GRAPHENE NANOCOMPOSITES

CROSS REFERENCE TO RELATED APPLICATION

This application is a continuation of U.S. Ser. No. 15/470,379, filed Mar. 27, 2017, which application is a continuation of U.S. Ser. No. 14/115,580, filed Nov. 4, 2013, now U.S. Pat. No. 9,636,855 B2, issued May 2, 2017, which application is a 371 entry in the U.S. from expired International Patent Application No. PCT/US2012/036376, filed May 3, 2012, which PCT application claims the benefit of U.S. Provisional Application No. 61/482,048 filed May 3, 2011, all herein incorporated by reference in their entirety for all purposes.

FIELD OF THE INVENTION

This disclosure is related to polymers in general and, more specifically, to strengthening of polymers by introduction of nanomaterials.

BACKGROUND OF THE INVENTION

Polymers have become an ever-present component of modern life. Products that used to be made from metals and other heavy materials using labor and/or energy intensive processes can now be made less expensively, more quickly, and with less energy input. Automotive, medical, information technology, and health care are but a small sampling of the industries that make ubiquitous use of polymers.

Making a device from a polymer generally results in an item that is lighter in weight than an equivalent item made from a structural metal or other material. However, with decrease in weight generally comes a decrease in strength. The decrease in strength may be a decrease in ability to withstand torsion, shearing, compression, pressure, or another force without buckling, breaking, or deforming to an unacceptable degree.

What is needed is a system and method for addressing the above, and related, issues.

SUMMARY OF THE INVENTION

The invention of the present disclosure, in one aspect thereof, comprises a nanocomposite material. The material contains a base polymer including polyethylene terephthalate (PET), and a nanoparticle that increases the strength of the base polymer. The nanoparticle may comprise graphene nanoplatelets that may be prepared by exfoliation. The graphene nanoplatelets may have an average diameter of 5 micrometers. They may comprise about two percent by weight of the nanocomposite material. In other embodiments graphene nanoplatelets may comprise about five, ten, or fifteen percent by weight of the nanocomposite material. In another embodiment the percentage by weight may range from about two to about fifteen.

The invention of the present disclosure, in another aspect thereof comprises a method of producing a nanocomposite material. The method includes providing polyethylene terephthalate (PET) as a base polymer, and providing a nanoparticulate substance. The method also includes compounding the base polymer with the nanoparticulate material to form a masterbatch product, and injection molding the masterbatch product. The nanoparticulate substance may comprise graphene. The graphene may be prepared by exfoliation.

In one embodiment the nanoparticulate substance may comprises about two percent by weight of the nanoparticle substance material in the masterbatch product. In other embodiments the percentage by weight may be about five, ten, or fifteen. In some embodiments it may range from about two percent to about fifteen percent.

BRIEF DESCRIPTION OF THE DRAWINGS

FIGS. 1A-1B: SEM micrographs of xGnP powder sample (a) 1000×; (b) 11000×.

FIGS. 2A-2B: Tensile tested samples of PET (A) and PET-15% xGnP Nanocomposite (B).

FIGS. 3A, 3B, 3C, 3D, 3E, and 3F: SEM micrographs of (A) PET, PET-xGnP Nanocomposite (B) 2% wt, (C) 5% wt, (D) 10% wt with micro voids, (E) 10% wt at 5 k x and (F) 15% wt samples.

FIGS. 4A, 4B, and 4C: TEM micrographs showing dispersion of the nanoplatelets in PET-15% xGnP nanocomposite; bright field images (A) 10 kx, (B) 20 kx and (C) dark field image @ 60 kx.

DETAILED DESCRIPTION OF THE PREFERRED EMBODIMENTS

Figure 5:
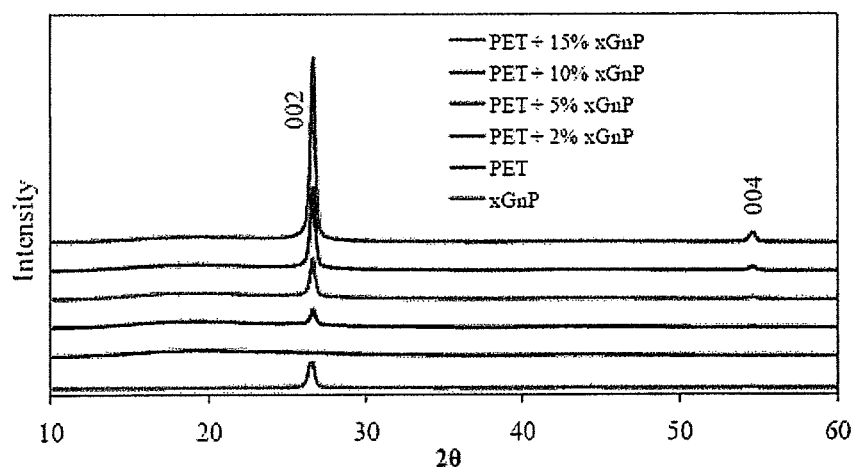
FIG. 5: Comparison of XRD patterns of xGnP powder with PET control and nanocomposite.

Base polymers may have a number of inherent characteristics relating to their appearance, color, hardness, strength, and any number of other measurable properties. In some cases, a base polymer is mixed with a predetermined amount of a material that will alter the properties of the base polymer. The material added to the base polymer is referred to as a masterbatch and the process of adding the masterbatch to the base polymer in such a way as to alter its properties may be referred to as a masterbatch process.

Polymers may also be prepared in a masterbatch process where further processing will create a completed product. For example, a polymer or a nanocomposite polymer, as described below, can be prepared into masterbatch pellets that are later molded into a completed product (e.g., by injection molding or other suitable processes).

In some embodiments of the present disclosure, nano-scale particles are blended or combined with a polymer into masterbatch pellets that may then be injection molded into completed products. The nano-scale material within the polymer of the masterbatch will only interact to alter the properties of the base polymer on a nano-scale, which provides some benefit over larger reinforcement mechanisms. Based on the Griffith crack theory and Weibull analysis, smaller particles are stronger and can be more effective in reinforcing the matrix compared to their larger counter parts. Also, with their increased surface area and high aspect ratios, lower volumes of smaller reinforcements can provide equivalent reinforcement.

Nanoparticle selection may be based on the required properties, interaction with the matrix, processing, cost, and application of the final composite. Several nanoparticles such as organoclays (MMT), metal nanoparticles (Al, and Ag), metal oxides (ZnO, silica), and carbon derivatives (CNT's, Fullerenes, Graphite oxide, graphene) may be useful in the preparation of polymer nanocomposites. In another embodiment, polyethylene terephthalate (PET)-graphene is utilized to create polymer nanocomposites. The material is appropriate for injection and blow molding, and other processing and manufacturing techniques.

Graphene (comprising a monolayer of carbon atoms) has excellent mechanical (modulus—1060 GPa, Strength—20 GPa) and electrical properties (50×10−6 I cm), compared with other nanoparticles. Graphene can disperse well in base polymers through the aid of surface treatments. Exfoliated Graphene Nanoplatelets (xGnP) are multiple graphene layers stacked to form platelets.

Regarding the specific combination of PET with graphene (e.g., as in certain embodiments of the present disclosure), PET is a widely used polymer but has heretofore been overlooked in the laboratory studies owning in part to the fact that it is relatively sticky and has a relatively high melting point. Furthermore, the constituent mer units of PET exhibit a polarity that can result in a dissolution of certain polar nanostructures when the products are mixed. It should be noted that graphene is a polar substance, meaning it might be expected to dissolve or lose its structural integrity in the presence of PET. However, as disclosed herein, graphene can and does maintain integrity sufficiently to favorably alter the physical characteristics of PET.

In one embodiment, PET-Exfoliated graphene nanocomposites are prepared using injection molding through a masterbatch process, where graphene nanoplatelets are compounded with PET to form masterbatch pellets. These experimental results were compared to theoretical performances using Halpin-Tsai and Hui-Shia models.

Continuous fiber composites are often assessed based on a simplified empirical formula, referred to as the 'Rule of Mixtures'. In the case of nanoreinforcements, the 'Rule of Mixtures' either under-estimates or over-estimates the final properties. This can be because of their low volume fractions and often greater disparity of properties between the matrix and reinforcement.

For nanocomposites, the special interaction between the nanoplatelets and matrix is important in determining their elastic behavior. High aspect ratios of the nanoplatelets combined with complex mechanisms at the matrix-reinforcement interface complicate nanocomposite property estimation. Therefore, traditional micromechanical models have been modified to estimate the mechanical properties for nanoparticles.

Experiment 1

Materials

In one demonstration, commercially available Polyethylene Terephthalate of 0.80 dl/g (I.V.) called oZpet™ (GG-3180 FGH, by Leading Synthetics, Australia) was used. Exfoliated graphene nanoplatelets, of xGnP®-M-5 grade (99.5% carbon) of average diameter 5 Pm as shown in FIGS. 1A-1B, were obtained as dry powder from XG Sciences, Inc. (East Lansing, Mich.). Graphene nanoplatelets (xGnP) and the as received PET resin were compounded into PET-xGnP masterbatch pellets by Ovation Polymers (Medina, Ohio) using their ExTima™ technology.

Graphene nanoplatelets are hydrophobic in nature; effective dispersion of graphene results from the interaction of oxygen and hydroxyl functional groups (formed due to the exposure of raw carbon during the fracture of platelets) on their surface with polar groups of PET [19]. Master batch pellets obtained from the above process were used as raw material for the injection molding process. PET control samples and PET-xGnP nanocomposite tensile bars of increasing weight fractions (2%, 5%, 10%, and 15%) were injection molded at 250° C.-260° C. temperature, following type—I specifications of ASTM D 638 (hereby incorporated by reference).

Characterization Techniques

The produced nanocomposite tensile bars (shown in FIGS. 2A-2B) were tested using a universal materials tester (Instron 5582 model). Tests followed the ASTM D 638 standard at a cross-head speed of 5 mm/min. A non-contact Laser Extensometer (Electronic Instrument Research, Model LE—05) was used to record displacement free of machine compliance. The laser extensometer records displacement of reflections from the self-reflective stickers placed at the gauge length.

Three composites of each kind were tested along with neat PET specimens for comparison. The laser displacement and load from the crosshead were simultaneously recorded at a time interval of 100 ms.

Dispersion of the graphene nanoplatelets was observed using Electron Microscopy (SEM, TEM) and X-ray Diffraction. SEM micrographs of the xGnP powder and the fracture surfaces of the PET, and PET-Exfoliated graphene nanocomposites were obtained using a Hitachi S-4800.

The PET control and the nanocomposite with lower graphene content were Au/Pt coated using a Baizers Union MED 010 coater. Thin sections (thickness of 70 nm) used for transmission imaging were microtomed using Reichert-Jung Ultracut E microtome. Transmission micrographs were collected using a JEOL JEM-2100 Microscope, with an operating voltage of 200 kV. X-ray diffraction patterns were collected in reflection, on a Bruker D8 Discovery diffractometer, using Cu Kα($\lambda$=1.54054 Å) radiation. XRD scans of the xGnP powder along with the PET samples were collected at 40 kV and 40 mA with an exposure time of 120 sec.

Results

Scanning Electron Microscopy

SEM micrographs of the xGnP dry powder shown in FIG. 1B shows an agglomerated platelet, with each platelet comprised of numerous graphene layers stacked together. These platelets were of 5 to 10 Pm average diameter and several nanometers (5-20 nm) in thickness.

Micrographs (FIGS. 3B, 3C, 3D, 3E, and 3F) of the PET-graphene nanocomposite failure surfaces showed that the graphene nanoplatelets remained intact and were dispersed into the PET matrix, with no signs of agglomeration. The micrographs elucidate that the failure of the nanocomposite under tensile loading was through coalescence of brittle micro-fractures. The presence of micro voids and the initiation of cracks from these voids can be noticed from the SEM micrographs of nanocomposite samples with 5% and 10% graphene nanoplatelet weight fraction. SEM micrographs show the nanoplatelets were projecting out of the fracture surfaces. They appear to be deformed and mixed with the matrix.

Transmission Electron Microscopy

The performance of nanocomposites depends on dispersion of the nanoparticles. TEM micrographs were collected from 70 nm thin sections to gain better understanding of nanoplatelet dispersion. The transmission micrographs shown in FIGS. 4A-4C, revealed the graphene nanoplatelets remained intact as platelets and were dispersed into the polymer matrix, individual dispersion of graphene sheets (complete exfoliation) was not found. Micrographs were collected in both bright and dark field modes. As the nanoplatelets consist of several individual graphene sheets, the 70 nm thick sections used may contain layers of polymer and graphene platelets, therefore dark field mode was advantageous. Graphene is more conductive than the polymer matrix so, in transmission imaging, this difference provides contrast.

X-Ray Diffraction

XRD patterns collected from the dry xGnP powder, PET control, and PET-xGnP nanocomposite are shown in FIG. 5. The diffraction pattern for the graphene nanoplatelets shows the graphene-2H characteristic peaks at 26.6° (d=3.35 Å) and 54.7° (d=1.68 Å) 2θ. Slight broadening of the peak at 26.6° 2θ indicates the presence of platelets with different dimensions. A broad amorphous peak from the PET control sample was observed around 19.2° 2θ. This confirms the control sample has an amorphous microstructure. As shown in FIG. 5, the intensity of the graphene peak at 26.6° 2θ increased with the weight fraction of the nanoplatelets. No peak shift was observed. This along with the TEM micrographs confirms that the nanoplatelets were not substantially exfoliated [20]. Further, the diffraction pattern confirms the PET matrix was amorphous as expected, at least within 0.2 mm of the surface.

Mechanical Behavior

Figure 6:
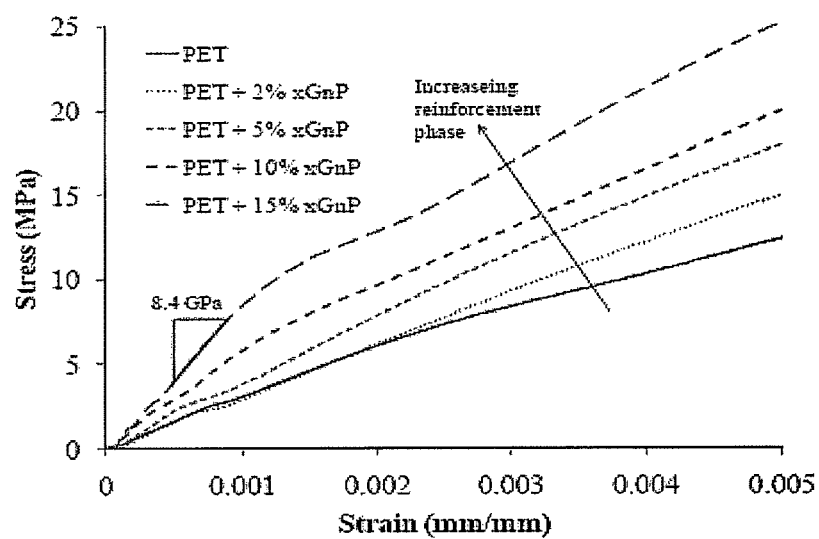
FIG. 6: Comparison of Stress-Strain curves of PET and PET-xGnP Nanocomposites.
Figure 7:
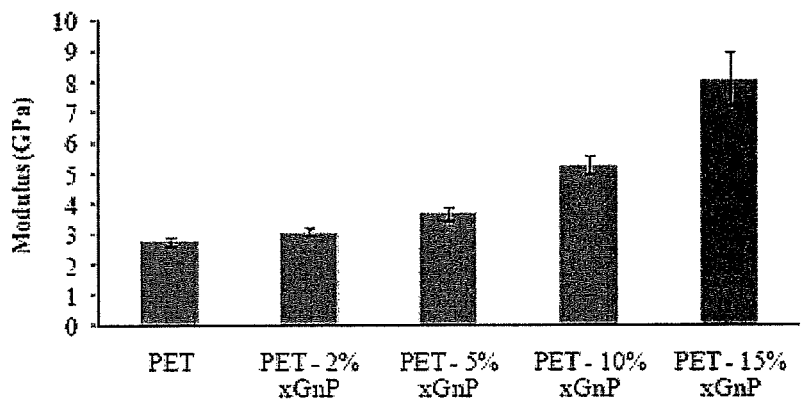
FIG. 7: Young's Modulus of PET Nanocomposites in comparison with control PET.

Stress-Strain curves for the PET control and nanocomposite were plotted as shown in FIG. 6, based on the data collected from the tensile tests. The addition of graphene nanoplatelets has increased the performance (modulus) over the pure PET up to 300% and follows an exponential trend as shown in FIG. 7. While primarily linear behavior is observed, a hump in the stress strain curve for the 15% nanocomposite, suggests an additional toughening mechanism for this composite over the other lower volume fraction. This may be due to a reinforcement-reinforcement interaction.

With the objective of understanding the effectiveness of graphene nanoplatelets as reinforcement, micromechanical models such as the Halpin-Tsai and the Hui-Shia models were used to determine the theoretical elastic mechanical performance of this PET-graphene nanocomposite. Micromechanical models estimate the properties based on assumptions, such as perfect reinforcements, homogenous dispersion, or consistent orientation of the reinforcements. An ideal case for superior performance of the graphene nanocomposite is to have defect free graphene sheets (monolayers) of the required length well dispersed in to the matrix and orientated along the direction of maximum load.

Gong et al. [16] have determined a required length for graphene platelets (>30 μm) to be effective as reinforcement. Mechanical properties of the graphene platelets such as stiffness and Poisson's ratio decrease with increase in the number of comprising layers, as observed by Georgantzinos et al. [22] with molecular simulations. They estimated that the stiffness of platelet comprising five layers decreases by 15% compared to single layer graphene, and they also noticed that the properties of the graphene differ based on their orientation. Modulus of the graphene platelet (flake) has been reported as 0.795 TPa [23].

TABLE 1

Properties of Graphene and PET used for theoretical predictions

| Graphene Platelet Properties | | | | |
|---|---|---|---|---|
| Average Length/Diameter (D) nanometers (min/max) | Average Thickness (t) nanometers (min/max) | Aspect Ratio (D/t) | Modulus (GPa) | PET Properties Modulus (GPa) |
| 300 (28/730) | 16 (3/28) | 18.75 | 795 | 2.7 |

Figure 8:
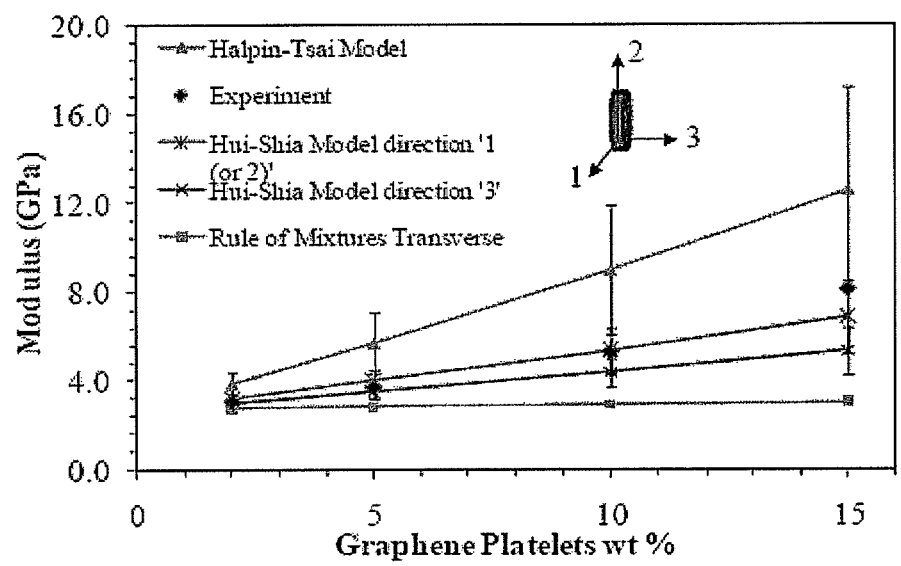
FIG. 8: Modulus of PET-graphene nanocomposites from predictions compared with experimental results.

In the present work, graphene platelets with a wide range of length (or diameter of the platelets present in the out of plane direction) and thickness were observed from the TEM micrographs. The change of particle size from the larger (5 μm) dry graphene powder to the smaller (300 nm), size as observed in the TEM images (FIG. 4) can be due to shearing during the compounding and molding process. Table 1 shows the average size of the platelets with minimum and maximum values. These platelet properties were then used in determining the performance range of the nanocomposites, based on the micromechanical models (error bars shown in FIG. 8). Predicted moduli of the nanocomposite from the micromechanical models were plotted against the experimental results, shown in FIG. 8. The modulus estimated through the Halpin-Tsai model is higher compared to the experimental value. The Halpin-Tsai model estimates the modulus of the composite with platelets being aligned along the loading direction. However, the platelets were not generally aligned in the direction of the loading. In addition, extremely high stiffness of the reinforcement compared with the matrix (>250x), make difficult accurate predictions through the Halpin-Tsai model [22]. The Hui-Shia model shows the best agreement. The Hui-Shia model estimates elastic modulus of the nanocomposite with platelets loaded both in parallel (axes 1 and 2) and perpendicular directions (along axis 3) as shown in FIG. 8. This model is valid for wide range of stiffness ratios over the Halpin-Tsai model [22].

In addition, stress transfer between the matrix to reinforcement in composites is critical in controlling their mechanical behavior. For example, graphene nanocomposites in PMMA matrix, the stress transfer between the matrix and graphene platelets and graphene-graphene sheets were shown dominated by week van der Waals forces, reducing the potential mechanical performance. However, micromechanical models do not account these changes in stress transfer behavior. This results a deviation from the experimental values.

The current experimental modulus showed reasonable agreement with theoretical predictions. This is in spite of the broad range in platelet geometry (see table). The best case was the Hui-Shia model with the modulus parallel to the platelet (direction—3). This suggests reasonable effectiveness of the reinforcement. With the reinforcement distributed randomly, behavior between the two Hui-Shia predictions of parallel and perpendicular might be expected. Further investigation to the randomness of the platelet distribution is needed for additional assessment. Even stiffer modulus enhancement could be expected if the platelets were of higher aspect ratio as the modulus predicted are sensitive to the aspect ratio. This is a reasonable goal with continued improvement in the production of the additives and their processing with the matrix. Clearly, nanoscale reinforcement is a benefit to the enhancement of mechanical properties.

Furthermore, from X-ray diffraction, the addition of graphene platelets does not show an impact on the final crystallization of PET. Economies of scale can improve the cost of any of these additives. More understanding of the effect nanoplatelets have on the injection molding process can help improve the composite properties further. For example, many different screw types are available for injection molding and need to be explored for their advantages in mixing and dispersion of additives.

Conclusions from Tests

The present disclosure demonstrates that graphene nanoplatelets are effective in achieving improved strength characteristics (such as elastic modulus) for Poly ethylene Terephthalate, or PET. Injection molding of masterbatch pellets is one successful method for preparation of PET-Exfoliated graphene (xGnP) nanocomposites of weight fractions from 2-15%. Comparison with simple mechanical models suggests their superior performance. The stiffness may not only dependent on the reinforcement stiffness, but also on its aspect ratio and the dominating mechanism for interfacial stress transfer between matrix and reinforcement. There is also some indication that the reinforcement-reinforcement interaction plays an important role as the volume fraction exceeds 10%.

REFERENCES

[1] T. Kuila, S. Bhadra, D. Yao, N. H. Kim, S. Bose, and J. H. Lee, "Recent advances in graphene based polymer composites," *Progress in Polymer Science*, vol. In Press, Corrected Proof.

[2] H. Fukushima, "Graphite Nanoreinforcements in Polymer Nanocomposites," in *Chemical Engineering and Materials Science*. vol. Doctor of Philosophy, 2003, p. 311.

[3] X. Jiang and L. T. Drzal, "Multifunctional high density polyethylene nanocomposites produced by incorporation of exfoliated graphite nanoplatelets 1: Morphology and mechanical properties," *Polymer Composites*, vol. 31, pp. 1091-1098.

[4] F. Hussain, M. Hojjati, M. Okamoto, and R. E. Gorga, "Review article: Polymer-matrix Nanocomposites, Processing, Manufacturing, and Application: An Overview," *Journal of Composite Materials*, vol. 40, pp. 1511-1575, Sep. 1, 2006 2006.

[5] D. R. Paul and L. M. Robeson, "Polymer nanotechnology: Nanocomposites," *Polymer*, vol. 49, pp. 3187-3204, 2008.

[6] H. C. Schniepp, J.-L. Li, M. J. McAllister, H. Sai, M. Herrera-Alonso, D. H. Adamson, R. K. Prud'homme, R. Car, D. A. Saville, and I. A. Aksay, "Functionalized Single Graphene Sheets Derived from Splitting Graphite Oxide," *The Journal of Physical Chemistry B*, vol. 110, pp. 8535-8539, 2006.

[7] B. Jang and A. Zhamu, "Processing of nanographene platelets (NGPs) and NGP nanocomposites: a review," *Journal of Materials Science*, vol. 43, pp. 5092-5101, 2008.

[8] K. Wakabayashi, C. Pierre, D. A. Dikin, R. S. Ruoff, T. Ramanathan, L. C. Brinson, and J. M. Torkelson, "Polymer-Graphite Nanocomposites: Effective Dispersion and Major Property Enhancement via Solid-State Shear Pulverization," *Macromolecules*, vol. 41, pp. 1905-1908, 2008.

[9] I. H. Kim and Y. G. Jeong, "Polylactide/exfoliated graphite nanocomposites with enhanced thermal stability, mechanical modulus, and electrical conductivity," *Journal of Polymer Science Part B: Polymer Physics*, vol. 48, pp. 850-858, 2010.

[10] F. M. Uhl, Q. Yao, H. Nakajima, E. Manias, and C. A. Wilkie, "Expandable graphite/polyamide-6 nanocomposites," *Polymer Degradation and Stability*, vol. 89, pp. 70-84, 2005.

[11] M. A. Rafiee, J. Rafiee, Z. Wang, H. Song, Z.-Z. Yu, and N. Koratkar, "Enhanced Mechanical Properties of Nanocomposites at Low Graphene Content," *ACS Nano*, vol. 3, pp. 3884-3890, 2009.

[12] K. Kalaitzidou, H. Fukushima, and L. T. Drzal, "A new compounding method for exfoliated graphite-polypropylene nanocomposites with enhanced flexural properties and lower percolation threshold," *Composites Science and Technology*, vol. 67, pp. 2045-2051, 2007.

[13] D. G. Miloaga, H. A. A. Hosein, M. Misra, and L. T. Drzal, "Crystallization of poly(3-hydroxybutyrate) by exfoliated graphite nanoplatelets," *Journal of Applied Polymer Science*, vol. 106, pp. 2548-2558, 2007.

[14] A. S. Patole, S. P. Patole, H. Kang, J.-B. Yoo, T.-H. Kim, and J.-H. Ahn, "A facile approach to the fabrication of graphene/polystyrene nanocomposite by in situ microemulsion polymerization," *Journal of Colloid and Interface Science*, vol. 350, pp. 530-537, 2010.

[15] Y. C. Li and G. H. Chen, "HDPE/expanded graphite nanocomposites prepared via masterbatch process," *Polymer Engineering & Science*, vol. 47, pp. 882-888, 2007.

[16] H. Hu, L. Onyebueke, and A. Abatan, "Characterizing and Modeling Mechanical Properties of nanocomposites—Review and Evaluation," *Journal of Minerals & Materials Characterization & Engineering*, vol. 9, p. 45, 2010.

[17] P. A. Beale, "Global Polyester Raw Materials Dynamics," in *The Packaging Conference*, Las Vegas, 2011.

[18] J.-H. Chang, S. J. Kim, Y. L. Joo, and S. Im, "Poly (ethylene terephthalate) nanocomposites by in situ interlayer polymerization: the thermo-mechanical properties and morphology of the hybrid fibers," *Polymer*, vol. 45, pp. 919-926, 2004.

[19] A. A. K, U. S. Agarwal, and R. Joseph, "Carbon nanotubes-reinforced PET nanocomposite by melt-compounding," *Journal of Applied Polymer Science*, vol. 104, pp. 3090-3095, 2007.

[20] H.-B. Zhang, W.-G. Zheng, Q. Yan, Y. Yang, J.-W. Wang, Z.-H. Lu, G.-Y. Ji, and Z.-Z. Yu, "Electrically conductive polyethylene terephthalate/graphene nanocomposites prepared by melt compounding," *Polymer*, vol. 51, pp. 1191-1196, 2010.

[21] A. B. Morgan and J. W. Gilman, "Characterization of polymer-layered silicate (clay) nanocomposites by transmission electron microscopy and X-ray diffraction: A comparative study," *Journal of Applied Polymer Science*, vol. 87, pp. 1329-1338, 2003.

[22] C. Y. Hui and D. Shia, "Simple formulae for the effective moduli of unidirectional aligned composites," *Polymer Engineering & Science*, vol. 38, pp. 774-782, 1998.

[23] O. L. Blakslee, D. G. Proctor, E. J. Seldin, G. B. Spence, and T. Weng, "Elastic Constants of Compression-Annealed Pyrolytic Graphite," *Journal of Applied Physics*, vol. 41, pp. 3373-3382, 1970.

[24] C. Y. Hui and D. Shia, "Simple formulae for the effective moduli of unidirectional aligned composites," *Polymer Engineering & Science*, vol. 38, pp. 774-782, 1998.

[25] D. Shia, C. Y. Hui, S. D. Burnside, and E. P. Giannelis, "An interface model for the prediction of Young's modulus of layered silicate-elastomer nanocomposites," *Polymer Composites*, vol. 19, pp. 608-617, 1998.

[26] H. Hua, L. Onyebueke, and A. Abatan, "Characterizing and Modeling Mechanical Properties of Nanocomposites-Review and Evaluation," *Journal of Minerals & Materials Characterization & Engineering*, vol. 9, pp. 275-319, 2010.

[27] J. C. H. Affdl and J. L. Kardos, "The Halpin-Tsai equations: A review," *Polymer Engineering & Science*, vol. 16, pp. 344-352, 1976.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A nanocomposite material comprising:
a polyethylene terephthalate base polymer; and
exfoliated graphene nanoplatelets compounded with said polyethylene terephthalate base polymer to increase strength of the polyethylene terephthalate base polymer, wherein said exfoliated graphene nanoplatelets are present between about two percent and fifteen percent by weight of the nanocomposite material.

2. The material of claim 1, wherein the nanocomposite material comprises about two percent by weight of the exfoliated graphene nanoplatelets.

3. The material of claim 1, wherein the nanocomposite material comprises about five percent by weight of the exfoliated graphene nanoplatelets.

4. The material of claim 1, wherein the nanocomposite material comprises about ten percent by weight of the exfoliated graphene nanoplatelets.

5. The material of claim 1, wherein the nanocomposite material comprises about 15 percent by weight of the exfoliated graphene nanoplatelets.

6. A method of producing masterbatch pellets, the method comprising:
providing a polyethylene terephthalate base polymer;
providing between about two percent and fifteen percent by weight exfoliated graphene nanoplatelets;
compounding the polyethylene terephthalate base polymer with the exfoliated graphene nanoplatelets so as to obtain exfoliated graphene nanoplatelets dispersed in the polyethylene terephthalate base polymer; and,
forming masterbatch pellets from the exfoliated graphene nanoplatelets dispersed in the polyethylene terephthalate base polymer.

* * * * *